Feb. 20, 1945. A. OLCHVARY, JR 2,369,751
TOOL CHUCK
Filed Nov. 1, 1943
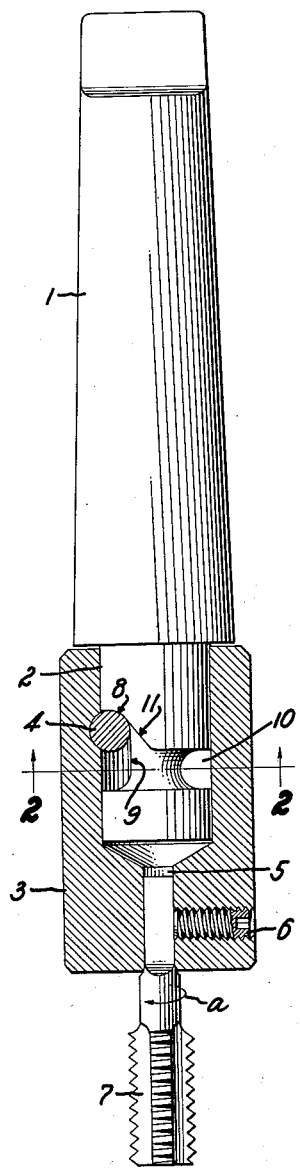
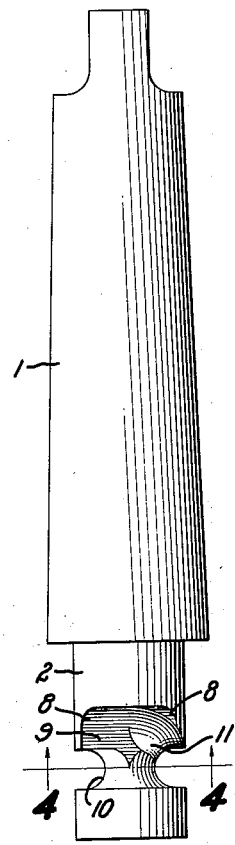
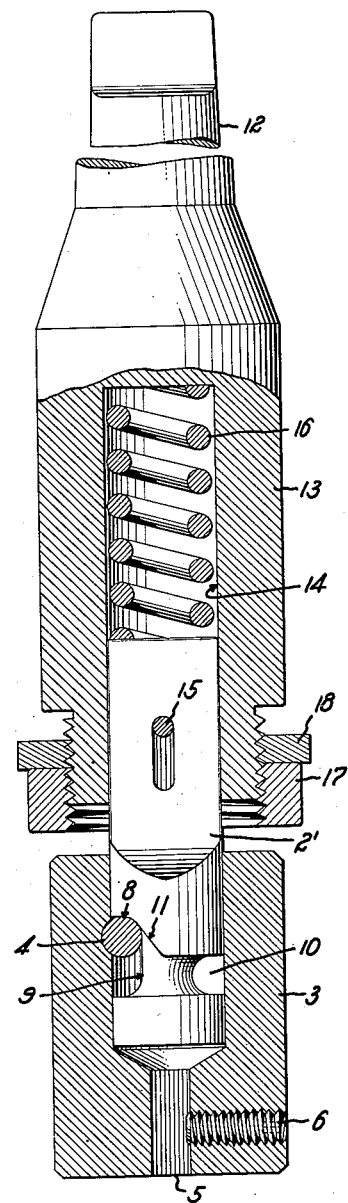
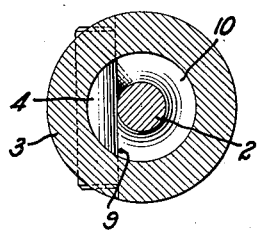
Inventor: Alexander Olchvary, Jr.
By Pierce & Scheffler, Attorneys.

Patented Feb. 20, 1945

2,369,751

UNITED STATES PATENT OFFICE 2,369,751

TOOL CHUCK

Alexander Olchvary, Jr., New Brunswick, N. J.

Application November 1, 1943, Serial No. 508,613

12 Claims. (Cl. 10—135)

This invention relates to tool chucks of the type employed to connect a source of power to a rotary tool, such as a drill, a tap or a reamer, and particularly to tool chucks with cooperating clutch parts that are automatically moved out of driving engagement when the resistance to rotation exceeds a chosen value.

The invention is particularly adapted to the practice of threading holes in hard materials with machine driven taps in view of the relatively high breakage of tools in such power operations as compared with manual operations in which the mechanic can sense the resistance set up by the tap. The self-releasing driving chucks may be used for other purposes but, for a specific example of use, the invention will be described as a tool chuck for use with a drill press, having back gears for reversing rotation, in driving a tap for the threading of bottomed holes.

The principal object of the invention is the provision of a mechanical coupling including a clutching device for connecting a rotating driving member to a driven member in relatively positive engagement and for maintaining them in such engagement until the resistance to rotation of the driven member exceeds a chosen value upon the occurrence of which disengagement of driving and driven members takes place.

Another object is to provide a mechanical coupling including, in linear arrangement, a driving member for attachment to a conventional source of power, a driven chuck member for receiving a rotative tool, and a clutch device for establishing a relatively positive connection of driving and driven members, the clutch device including relatively movable elements for disengaging the driving and driven members upon the occurrence of an overload on the device.

Another object of the invention is to provide a tool chuck including a clutch for the relatively positive engagement of driving and driven members in one direction of rotation for loads within the preselected torque limit set for the clutch, and for positive engagement of driving and driven members in the opposite direction.

Another object is to provide a tool chuck having a clutching device with automatic release which can be made cheaply, of few parts, which is economical of space, rugged in construction and particularly adapted for operation by unskilled workers.

These and other objects and advantages of the invention will be apparent from the following specification when taken with the accompanying drawing, in which Fig. 1 is a side elevation of a tool chuck embodying the invention, and a tap mounted in the chuck, the chuck parts being shown in position for relatively positive driving engagement;

Fig. 2 is a transverse section as seen on the plane of the line 2—2 of Fig. 1, and looking in the direction indicated by the arrows;

Fig. 3 is an elevation of the driving element of the chuck as seen from the left side of Fig. 1;

Fig. 4 is a transverse section as seen on the plane of line 4—4 of Fig. 3, and looking in the direction indicated by the arrows; and Fig. 5 is a fragmentary elevation, with some parts shown in substantially central section, of another embodiment of the invention.

The assembled tool chuck is made up of a driving member having a tapered shank 1 for insertion into the drill press chuck and an operating shank 2 of novel shape that forms one element of the clutch, a driven member or chuck body 3 that is telescoped over the shank 2, and a pin 4 that extends through the driven member 3 to serve as a clutch element cooperating with the clutch surfaces of the shank and also as a retaining pin that prevents separation of the parts after their initial assembly. The driven member 3 has a central bore 5 of appropriate shape for receiving the end of tap 7 and a transverse bore into which the set screw 6 is threaded to retain the tap in place. The illustrated tap is of the usual "right hand thread" type and it is to be turned in the direction of the arrow $a$ to thread the wall of a previously drilled opening.

The outer cylindrical surface of the shank 2 has an easy sliding and turning fit within the cylindrical bore of the driven member 3, and a part of the shank 2 is cut away to form the clutch section for receiving the pin 4. The upper surface 8 of this clutch section is cylindrical and substantially complementary to the quarter-round surface of the upper right quadrant of the pin 4 as viewed in Fig. 1. The radius of the pin 4 will usually be somewhat smaller than that of the surface 8 in view of the tolerances customary in machine tool manufacture and, when the axis of the pin 4 crosses the bore of the member 3, see Fig. 2, the quarter-round surface 8 is inset inwardly from the outer edge of the shank 2. The lower edge of the surface 8 merges into a flat surface 9 that extends downwardly, and substantially parallel to the axis of the shank 2, to "fade out" where it meets the base of a circumferential groove 10 that extends around the shank 2. The curved surface 8 and flat surface 9 also merge into a cam surface 11, or left-hand thread, that extends from the curved surface 8 to the groove 10.

The configuration of the clutch section of the shank 2 may be readily visualized by considering the following, and at present the preferred, method of manufacturing the illustrated driving member. The groove 10 may be cut while the driving member is turned in a lathe, and the upper curved surface 8 may be formed by a rotary cylindrical cutter that is moved radially inwards towards the axis of the shank 2 while the driving member is held stationary. The flat surface 9 is then formed by rotating the cutter while moving the driving member axially until the cutter just touches the lower surface of the groove 10. The cam surface or thread 11 is cut by returning the cutter to engage the surface 8, and in then moving the cutter toward the groove 10 while simultaneously turning the driving member and moving it axially. The relative order of the cutting operations may be varied and the circumferential groove 10 may be cut with the cylindrical milling cutter by rotating the driving member, while holding it against axial movement, after the cutter is displaced axially to form the flat surface 9 or the partial thread 11.

The pin 4 is preferably of slightly smaller radius than the groove 10 and the curved surfaces to avoid binding from dimensional variations in manufacture or resulting from temperature produced changes. The pin 4 is preferably mounted in the driven member 3 by a force fit in a transverse off-center bore but it may be threaded or otherwise secured in place. It will be apparent that driven member 3 is not coupled mechanically to the shank 2 when these parts are axially displaced to bring the pin 4 into the groove 10, and that they are coupled mechanically when the parts are in the positions shown in Figs. 1 and 2.

The operation of the clutch in use will be described. After assembly of the chuck, a tap 7 is fastened in member 3 as indicated, the tapered shank 1 is inserted into the chuck of a drill press. The drill press is put into operation at a speed considered appropriate for the size of tap used and character of material being threaded, and for the clutch illustrated, the direction of rotation is clockwise or "right handed." Pressure is exerted longitudinally upon the chuck by the operator of the drill press as the tap is inserted into the hole to be threaded. Pin 4 is positioned against the curved surface 8, which will hereinafter be designated as engagement seat, or seat. If not initially in this position, a momentary reversal of the drill press will cause the pin 4 to slide along cam surface 11 into that position. The engagement of driven member 3 and the shank 2 of the driving member 1 is due to the resistance of pin 4 to displacement from seat 8. To leave the seat the pin must move longitudinally, but no longitudinally directed force exists to cause such movement, i. e., the longitudinal force exerted by the drill press is directed in the opposite direction, and opposes such movement. The members can be made to move apart longitudinally and become disengaged if pin 4 can be made to slide along the helical cam or "left hand" thread 11. This rotation of member 2 relative to member 3 occurs when the resistance of member 3 to rotation, because, say, the tap 7 hits hard metal or reaches the bottom of the hole being tapped, is sufficiently great to overcome the frictional resistance set up by the cam surface, and to exert a force component longitudinally of the clutch equal to or greater than that exerted by the operator through the drill press. The cam surface is usually coated with a lubricant to reduce friction and wear, but the shape of the cam, and smoothness of its surface are important factors in determining the maximum torque, which can be transmitted by the clutch. The steeper the cam (the greater the pitch of the left hand thread), the greater must be the torque transmitted before member 2 will be pushed upwards to carry the pin 4 into the annular groove 10 in which it does not block rotation of the driving member 1, 2.

As soon as the operator notes the disengagement of the clutch, he reverses the drill press which permits the driving member to move downward, the pin 4 riding up the left hand cam surface 11 to be positioned again in seat 8, and rotates the driven member 3 counterclockwise. The tap thereby is reversed and released from its over-tight position. If it had reached the depth desired, it is rotated in reverse until removed from the hole; if further threading is wanted, the tap is rotated in reverse just far enough to break it away from its tight position, and then rotated clockwise again to continue the threading operation. If the metal is particularly hard, or the tap dull, the clutch may release several times before threads are run to the depth wanted, thus preventing possible breakage of the tap as would a careful mechanic turning a tap under similar conditions with a hand wrench.

The described construction has proved very satisfactory in use with drill presses of the type in which the feed presure, or force exerted longitudinally of the drill press shaft, is controlled by the operator. Tests on one embodiment of the invention that had been employed in the tapping of several thousand holes showed that the torque at which the clutch released could be varied over a range of about .4 to 7 foot pounds as the axial pressure was adjusted from 30 to 60 pounds. The maximum torque that may be imposed upon the tap or drill can be rendered independent of the pressure applied through the drill press by including a pressure limiting spring in the tool chuck.

A construction of this constant torque release type is illustrated in Fig. 5. The driving element has a tapered shank 12 for insertion in the drill press chuck and a socket 13 with a non-circular bore 14 in which the driving clutch member 2' may slide axially but is held against relative rotary movement. Axial movement is limited by a pin 15 that is fixed to the socket 13 and extends through a slot in the upper end of the member 2'. A spring 16 is located in the socket to exert a pressure on the member 2' that is limited by the adjustment of a nut or collar 17 on the lower threaded end of the socket 13. A locking washer or collar 18 is also threaded upon the shank 13 for securing the collar 17 in any desired position of adjustment. The clutch surfaces of the member 2' are identical with those previously described, and the driven member 3 is coupled to clutch member 2' by a pin 4.

The pressure applied to the shank 12 can be increased to any value in excess of that sufficient to compress the spring 16 to seat the lower face of the nut 17 against the driven member 3, but the axial movement of the clutch member 2' to release the driving engagement is limited only by the force exerted by the spring 16. This force, and the corresponding torque-release value, may be adjusted by screwing the collar 17 up and down the socket 13. The frictional engagement of the collar 17 on the member 3 tends to drive the member 3 after the release of the clutch but the torque that may be transmitted through this frictional contact is of an order substantially lower than that which will effect an automatic release of the clutch elements.

It is broadly new, so far as I am now aware, to construct a tool chuck with two members that are telescoped for relative axial and rotary movement, and are coupled by a clutch comprising a coupling element on one member and normally engaging a driving seat at one end of an interrupted thread cut in the other member, the thread extending in a sense opposite to the driving direction from the driving seat to a circumferential groove in which the coupling element is freely movable.

It is therefore to be understood that the invention is not limited to the particular embodiments herein shown and described, and that various modifications fall within the spirit of my invention as set forth in the following claims.

I claim:

1. In a device of the character described, a rotary driving member and a driven member telescoped for relative axial and rotary motion, and a torsion-releasable clutch comprising a clutch coupling element secured to one member and cooperating clutch surfaces on the other member; said clutch surfaces comprising an interrupted thread extending from a driving seat to a circumferential groove in which the coupling member is freely movable for relative rotation of said members, the thread extending in a sense opposite to the desired driving direction, whereby the maximum torque that may be transmitted through said clutch depends upon the axial pressure exerted on the members through said coupling element.

2. The combination with a pair of axially alined rotary members, one member having means for connection to a rotating power source and the other member having means for attachment to a device to be rotated in a desired direction, of clutch means coupling said members for relative axial and rotary movement; said clutch means comprising a coupling member on one member, the other member having a circumferential groove in which the coupling member is freely rotatable and a helical groove opening into the circumferential groove and extending therefrom in a sense opposite to the desired direction of rotation to form an interrupted thread, thereby to provide an impositive drive in the desired direction that limits the maximum transmitted torque in accordance with the axial pressure exerted on said members and to provide a positive drive in the reverse direction.

3. The invention as recited in claim 2, wherein said coupling member is carried by the member of said pair that has means for attachment to the device that is to be rotated.

4. The invention as recited in claim 2, in combination with means adjustable to control the maximum axial pressure that may be exerted between said members.

5. The invention as recited in claim 2, wherein said clutch means includes a shank on the member that has means for connection to a rotary power source, said circumferential and helical groove being cut into said shank.

6. A tool chuck comprising a driving member having a shank for connection to a source of power and a driving clutch shank, a driven member telescoped over said clutch shank for axial and rotary movement with respect thereto, a coupling member secured to said driven member for cooperation with said clutch shank; said clutch shank having a circumferential groove in which said coupling member is freely movable, for relative rotation of said members, a a driving seat on said clutch shank spaced axially from said circumferential groove, and a cam surface extending from said circumferential groove to said driving seat, the cam surface having a pitch opposite to the desired direction of rotation of the driven member.

7. A tool chuck as recited in claim 6, wherein said coupling member is a pin extending transversely through said driven member and offset from the axis thereof.

8. A tool chuck as recited in claim 6, wherein said coupling member is a pin extending transversely through said driven member and offset from the axis thereof, and said driving seat comprises a surface on said clutch member complementary to a portion of the surface of said pin.

9. A clutching device adapted for an impositive engagement of a driving member and a driven member at one relative position of the members along a common axis and adapted for disengagement of said members at another relative position of the members along said axis, said driving member comprising means for attachment to a source of power and a shank having a driving surface extending transversely across one side thereof, an annular groove in said shank spaced longitudinally from said driving surface, and a generally longitudinally extending depression joining the driving surface and the annular groove, said longituidnally extending depression being characterized by being defined along one side by a boundary extending generally helically along said shank; said driven member having a bore within which the shank of the driving member is telescoped and having a pin extending transversely across said bore at one side thereof, the pin being positioned to seat against the driving surface of the shank of the driving member when the members are impositively engaged and being movable in the longitudinally extending depression of the driving member along the helical boundary thereof and into said annular groove when the members move relatively to assume a condition of disengagement.

10. A clutching device for transmission of power by the rotation thereof, said device comprising a member having a shank telescoped within the bore of a second member, one member having means for connection to a rotary power source and the other having means for connection to a device to be rotated in a desired direction, said shank having a transverse shoulder and an annular groove spaced longitudinally from said shoulder and joined thereto by a depression extending generally longitudinally and having one boundary defined by a surface extending helically on said shank; said second member having a pin extending transversely across the bore thereof and displaced from the axis of the bore, the pin being adapted to seat against the transverse shoulder of said shank to provide an impositive transmission of power between said members when the two members are brought together by longitudinally applied force; said transmission of power being interrupted when the resistance to rotation exceeds a predetermined value, said interruption taking place upon the movement of said helical surface over said pin until said pin is free for relative motion in the annular groove in the shank of said first member.

11. In a tool chuck, a driving member having a shank telescoped within a driven member, said shank having a circumferential recess and an interrupted thread opening into the recess, means carried by said driven member and cooperating with said interrupted thread to form an impositive clutch coupling said members to transmit a torque limited by the axial pressure of engagement of said shank on said means of the driven member, a socket member in which said driving member is telescoped, means preventing relative rotation of said driving member and said socket member, and a spring within said socket member for exerting axial pressure on said driving member.

12. In a tool chuck, the invention as recited in claim 11, in combination with means adjustable to regulate the pressure exerted upon said driving member by said spring.

ALEXANDER OLCHVARY, Jr.